July 15, 1941.    N. K. OLSON    2,249,164
ELECTRICAL MEASURING SYSTEM
Filed May 1, 1940

INVENTOR
*N. K. Olson*
BY *William R. Ballard*
ATTORNEY

Patented July 15, 1941

2,249,164

UNITED STATES PATENT OFFICE 2,249,164

ELECTRICAL MEASURING SYSTEM

Nels Kermit Olson, Seattle, Wash., assignor to American Telephone and Telegraph Company, a corporation of New York Application May 1, 1940, Serial No. 332,832

6 Claims. (Cl. 179—175.3)

This invention relates generally to electrical testing and measuring systems. This invention relates more particularly to arrangements for determining and locating impedance irregularities in the conductors of a cable pair. The invention also relates to arrangements for locating the impedance unbalances in the conductors of a cable quad. The invention further relates to arrangements for measuring the velocity of current flow along the conductors of a cable.

Heretofore in locating an impedance irregularity in the conductors of a cable pair, a Wheatstone bridge circuit was used to which the cable pair was connected as one of the arms of the bridge. Another of the arms of the bridge comprised adjustable elements of resistance, inductance and capacitance for balancing the bridge with respect to the cable pair. A source of alternating current of adjustable frequency was connected as one of the diagonals of the bridge and a head set was connected as the other diagonal of the bridge, the head set being used to indicate when the bridge was balanced as the frequency of the alternating current and the resistive and reactive elements were all varied over a wide range. With such apparatus readings were obtained for both the resistance and reactive components necessary to obtain a balanced condition in the bridge and these values were later plotted against the frequencies used and the plots—which generally indicated periodic variations—were then used in mathematical computations to obtain the distance to the irregularity. This practice is quite complicated and time-consuming.

In accordance with this invention the impedance irregularities and the like may be obtained more readily and with fewer adjustments. A source of alternating voltage of adjustable frequency may be connected to the circuit to be observed, some of the voltage of the source being impressed upon two of the plates of an oscilloscope, for example, and the voltage reflected from the circuit to be observed is simultaneously impressed upon the other two plates of the oscilloscope. As the frequency of the source is varied, identical patterns will be formed on the luminescent screen of the oscilloscope at regular intervals, the frequency intervals of which may be used to locate the impedance irregularity quickly and accurately.

Figures 1, 1A:
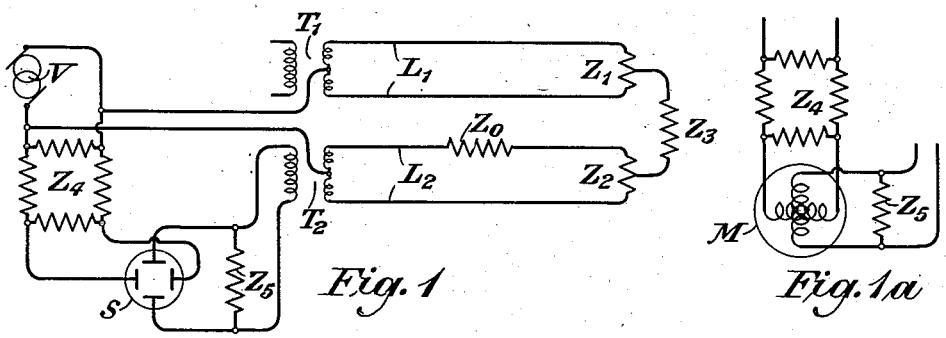
Figure 2:
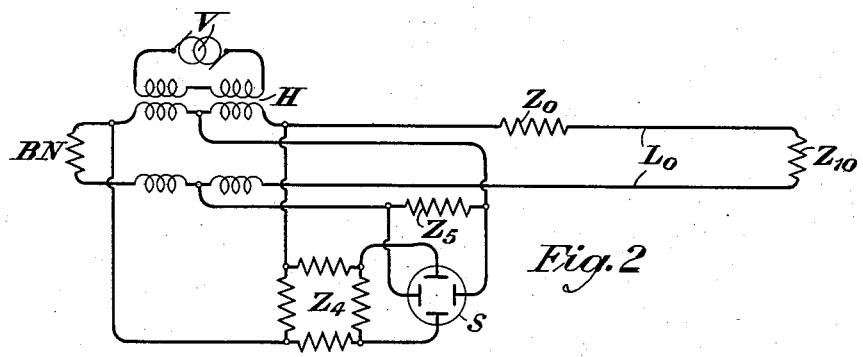
Figure 3:
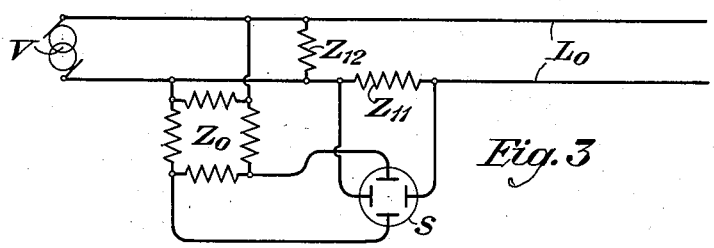
Figure 4:
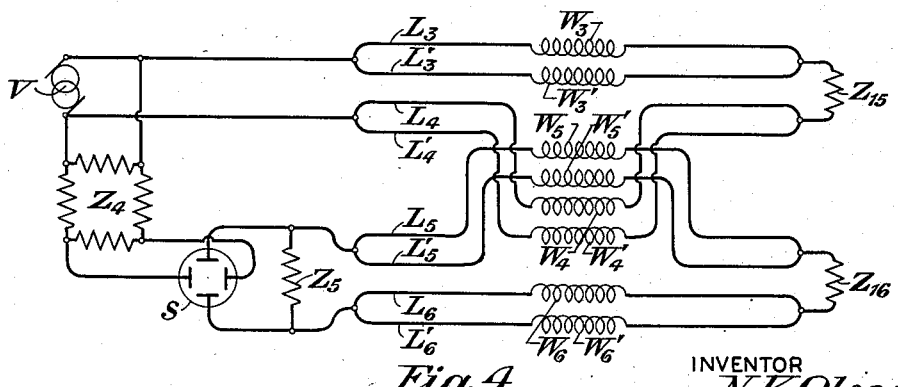

This invention will be better understood from the detailed description hereinafter following when read in connection with the accompanying drawing in which Figure 1 illustrates the invention, including an oscilloscope, applied to an arrangement for locating an impedance unbalance in the conductors of a cable quad. Fig. 1a shows a modification of the arrangement of Fig. 1 in which a dynamometer is used in place of the oscilloscope; Fig. 2 shows the invention used for measuring impedance irregularities in a cable pair; Fig. 3 illustrates the apparatus of the invention employed for measuring the velocity of current propagation along the conductors of a cable; and Fig. 4 is a modification of the arrangement of Fig. 1 applied to the location of a split in the phantom loading coil of a cable quad.

Referring to Fig. 1 of the drawing, reference character V designates an oscillator or generator of alternating current the frequency of which is adjustable manually or automatically in any well known manner over a wide range, as, for example, a range extending from 100 cycles to 4,000 cycles. The current of this oscillator is impressed upon the phantom circuit formed by the side circuits $L_1$ and $L_2$ through repeating coils $T_1$ and $T_2$ in a manner well understood in the art. The side circuits $L_1$ and $L_2$ are terminated in suitable impedance networks $Z_1$ and $Z_2$ and the midpoints of the latter networks are interconnected by a third network $Z_3$ which is used to terminate the phantom circuit of the quad. The source of alternating current V is also connected to the horizontal plates of an oscilloscope S of well known construction, the connection to the oscilloscope being made through a pad $Z_4$ which may include four impedance elements used for interposing a loss of any desired magnitude. The pad $Z_4$ may be made adjustable for obtaining any loss required in the practice of this invention. The primary or left-hand winding of the repeating coil $T_2$ is bridged by an impedance $Z_5$ which is designed to provide a proper termination for the lower side circuit $L_2$. This winding of the repeating coil $T_2$ is also connected through the impedance $Z_5$ to the vertical plates of the oscilloscope S. In this figure an impedance unbalance is represented schematically by the reference character $Z_0$. This unbalance may be located at any point along either of the side circuits $L_1$ or $L_2$, but in order to explain this invention in one of its aspects, it has been shown in the lower side circuit $L_2$.

Were there no impedance unbalance $Z_0$ in the quad, the alternating current of the source V would be transmitted along the phantom formed by the side circuits $L_1$ and $L_2$ and this current would be fully dissipated at the distance end of the system, namely $Z_3$ and portions of $Z_1$ and $Z_2$. There would be practically no current returned over either of the side circuits nor over the phantom. The horizontal plates of the oscilloscope would be energized by the current of the source V which is impressed upon these plates through the pad $Z_4$, but the vertical plates would be virtually unenergized, and hence the balanced condition of the quad would be plainly indicated on the screen of the oscilloscope. When an impedance unbalance such as $Z_0$ occurs in the quad, however, a very different situation will result, as will now be explained.

The impedance unbalance $Z_0$ will produce a reflection of the impressed current supplied by source V to the system. The voltage generated by the impedance $Z_0$ will flow in part along the phantom toward the impedance $Z_3$ to ground while another part of this generated voltage will be circulated around the lower side circuit $L_2$ back toward the sending end of the system as, for example, repeating coil $T_2$. This latter voltage will be transmitted through the impedance $Z_5$ to the vertical plates of the oscilloscope. The difference in phase between the voltage of the source V and that returned on account of the unbalance $Z_0$ will result in a pattern on the screen of the oscilloscope S which, as is well understood in the art, will indicate whether or not the two voltages are in phase or whether their phase relations are different by some multiple of, for example, 90 degrees.

As the frequency of the source V is varied, a straight line pattern, inclined at an angle which may conveniently be made about 45 degrees to the horizontal by adjusting the relative potentials on the plates in a manner well understood, will be obtained when the transmitted and reflected voltages are in phase or 360 degrees or multiples of 360 degrees apart. With further variations of the frequency the straight line pattern will be changed into an elliptical form with its major axis approximately in the direction of the straight line just referred to. With still further and further changes of frequency, the pattern may become of circular or elliptical configuration with the axes horizontal and vertical; thereafter an ellipse with its major axis about 90 degrees displaced with respect to the axis of the former ellipse; and thereafter another straight line pattern will be obtained which will be approximately 90 degrees displaced with respect to the first-mentioned straight line pattern. As the frequency is further varied this cycle of events will be reversed and ultimately a straight line of the first-mentioned slope will be again obtained. This complete cycle will be repeated again and again as the frequency is raised to large values.

If the frequencies of the source V which yielded the straight line patterns are noted, it will be clear that the distance to the impedance irregularities $Z_0$—which is a function of the interval between the frequencies giving these straight line patterns—may be readily determined with considerable accuracy. The simplicity of the apparatus and the facility with which the location of unbalance or irregularities or the like may be determined will be apparent.

The pad of $Z_4$ may be omitted if desired. If it is included, however, it is simply used to equalize the voltage applied to the horizontal plates of the oscilloscope with respect to the voltage or voltages reflected to the vertical plates. Moreover, an amplifier (not shown) may also be inserted between source V and the horizontal plates of the oscilloscope S, if desired. The source of alternating current V may, of course, be used in frequency ranges well above the audible range as, for example, in the carrier range.

Fig. 1a shows only a part of the circuit of Fig. 1 to illustrate that the oscilloscope may be replaced by a dynamometer detector such as M. The dynamometer detector M may include two windings, one of which may be connected to the pad $Z_4$ and the other to the impedance $Z_5$ (both of which are also shown in Fig. 1). One of the two coils of the dynamometer detector M will be movable and the other fixed, and, as is well understood, the pointer of this instrument will swing back and forth along its scale as the phase differences of the currents applied to the two coils change, the pointer reaching a minimum point along the scale when the phase difference is 90 degrees or any odd multiple thereof. In the apparatus of Figs. 1 and 1a as well as throughout this invention, it is only necessary to vary the frequency of the alternating current source progressively over a range of frequencies to obtain values for the simple determination of the location of any irregularity or unbalanced condition.

Fig. 2 shows the invention employed for determining the location of any irregularity such as $Z_0$ in the conductors of a cable pair. The source V is connected in series with one of the windings of a three-winding hybrid coil H. The other two windings of the hybrid coil H are connected to the line or pair $L_0$ which is terminated at the near end in a balancing network BN, as shown, and at the distant end the line is terminated in a network $Z_{10}$ in a well-known manner. The balancing network BN is intended to balance the pair $L_0$ (with the irregularity $Z_0$ absent) in both its resistive and reactive components as is well known in the art. The central winding of the hybrid coil H is connected through the pad $Z_4$ to the vertical plates of the oscilloscope S. The midpoints of the lower two windings of the hybrid coil H are connected to the horizontal plates of the oscilloscope through the impedance network $Z_5$. It will be clear, of course, that a dynamometer detector instrument of the type illustrated in Fig. 1a may be substituted in place of the oscilloscope S if so desired.

Were there no irregularity such as $Z_0$ in the pair $L_0$, the current of the source V, whatever its frequency, would be transmitted through the hybrid coil H, this current flowing equally into the line $L_0$ and balancing network BN and there would be no residual current in $Z_5$. In that case a voltage would be transmitted to the vertical plates of the oscilloscope S but virtually no voltage would be impressed upon the horizontal plates. As in the case of Fig. 1 the absence of any irregularity in the pair $L_0$ would be apparent to the operator seated in front of the oscilloscope S. But if an irregularity such as $Z_0$ develops anywhere along the line of the pair $L_0$, the reflected voltage will be circulated through the pair $L_0$ and this reflected voltage will appear across the midpoints of the lower two windings of the hybrid coil H. This voltage will be transmitted through the impedance $Z_5$ to the horizontal plates of the oscilloscope S. As the frequency of the source V is varied, as already described, the straight line patterns obtained at regular intervals as the frequency changes may be noted and from these notations the location of the irregularity will be determined with considerable accuracy.

Fig. 3 shows the invention applied to a two-wire circuit either for measuring the velocity of current propogation from the source V at any of its different frequencies over the circuit $L_0$, or for locating an impedance irregularity therein. The source V supplies a current through the pad $Z_0$ to the vertical plates of the oscilloscope S, as in the previous cases considered, and a voltage developed across an impedance $Z_{11}$ in series with the cable pair $L_0$ is impressed upon the horizontal plates of the oscilloscope S. Whenever desired, the near end of the cable pair $L_0$ may be bridged as shown by an impedance such as $Z_{12}$.

In the arrangement of Fig. 3 an elliptical pattern will appear upon the screen of the oscilloscope S when the phases of the two voltages impressed upon the opposite pairs of plates of the oscilloscope S differ by some odd multiple of 90 degrees. This elliptical pattern may not be of considerable practical utility. When the two voltages are some even multiple of 180 degrees apart, however, the pattern of the oscilloscope will be practically a straight line inclined at a convenient angle such as 45 degrees with the horizontal. When the phase displacement of these two voltages is some odd multiple of 180 degrees, the pattern will be a straight line but its slope will be inclined at the same angle to the horizontal but lying in the other quadrants. Repeated occurrence of these two differently sloped lines may be used to determine either the velocity of propagation of current along the pair or of the location of some irregularity therein.

Fig. 4 resembles Fig. 1 except that the invention is here used to locate a split in a phantom loading coil. In this arrangement the conductors $L_3$ and $L'_3$ are connected together though these two conductors are in series with two of the coils $W_3$ and $W'_3$. Similarly the conductors $L_4$ and $L'_4$ are tied together though they are respectively in series with coils $L'_4$ and $L_4$. Conductors $L_5$ and $L'_5$ are similarly related to coils $W_5$ and $W'_5$ and conductors $L_6$ and $L'_6$ are likewise related to coils $W_6$ and $W'_6$. The pair of conductors $L_3$ and $L'_3$ and the pair of conductors $L_4$ and $L'_4$ are connected together through a terminating impedance $Z_{15}$ at the distant end. Similarly an impendance $Z_{16}$ terminates the lower four conductors $L_5$ and $L'_5$ and $L_6$ and $L'_6$.

Because of the coupling between the circuits of the conductors $L_4$ and $L'_4$ and $L_5$ and $L'_5$, reflection will occur at the phantom loading coil arrangement here shown and the reflected voltage will set up a field between the vertical plates of the oscilloscope which may have a phase different from that of the voltage obtained from the source V. By varying the frequency of the source V as in the case of Fig. 1, the patterns progressively obtained on the screen of the oscilloscope S may be resolved to locate the split in the phantom coil arrangements.

The various pair or quads of conductors shown in the various figures of the drawing may be loaded or unloaded circuits. The invention is equally applicable to both types of circuits.

Whenever the reflected voltage requires amplification an amplifier may be used. Such an amplifier (not shown) may be inserted in Fig. 1, for example, between the impedance $Z_5$ and the vertical plates of the oscilloscope S. In practically all cases where an amplifier is used, no pad such as $Z_4$ will be required.

In using this invention it will be clear that it is unnecessary to plot the various frequency values which are required to produce patterns of predetermined configurations. In this respect the apparatus of this invention represents a marked step in advance of prior testing and measuring practices. Only one element in the system need be variable and that is the generator of alternating current. Even this element may be automatically adjustable so as to change progressively over a wide range of frequencies and it may include a calibrated scale which may be read to indicate to the observer when the patterns on the associated instruments reach some predetermined configuration.

While this invention has been shown and described in certain particular arrangements merely for the purpose of illustration, it will be understood that the general principles of this invention may be applied to other and widely varied organizations without departing from the spirit of the invention and the scope of the appended claims.

What is claimed is:

1. Apparatus for locating an irregularity in a cable circuit, comprising an oscillator of adjustable frequency connected to said circuit, an oscilloscope two of the opposite plates of which are connected to said oscillator, said circuit being connected to the other two plates of said oscilloscope for receiving the voltage reflected by the irregularity, and means for varying the frequency of the oscillator continuously to observe the frequencies at which identical patterns are visible on the screen of the oscilloscope.

2. Apparatus for locating an impedance unbalance in a telephone circuit, comprising a balancing network, a hybrid coil interconnecting the balancing network and the circuit, a source of alternating current connected to the hybrid coil, said source being continuously variable in frequency over a broad range, and an oscilloscope two of the plates of which are connected to said source, the other two plates of said oscilloscope being connected to the midpoints of said hybrid coil.

3. Apparatus for indicating the presence of an impedance irregularity or unbalance in a telephone circuit, comprising a source of alternating current the frequency of which is continuously variable over a wide range, means for transmitting the current of said source over the telephone circuit, an oscilloscope one pair of plates of which is connected to said source, means for applying to the other pair of plates of said oscilloscope a voltage reflected by the impedance irregularity or unbalance in the circuit, and means for substantially equalizing the voltages impressed upon the two pairs of plates of the oscilloscope.

4. Apparatus for locating an impedance unbalance in a cable quad, comprising an oscillator the frequency of which is continuously variable over a wide range, means for impressing the voltage of said oscillator upon the phantom circuit of said quad, an oscilloscope having one of its pairs of plates connected to said oscillator, and means for interconnecting the other pair of plates of said oscilloscope with one of the side circuits of said quad.

5. Apparatus for indicating and locating an impedance irregularity or unbalance in a telephone circuit, comprising a source of alternating current connected to said telephone circuit, an oscilloscope having a screen for indicating the phase difference between the voltage of said source of alternating current and the voltage reflected from the telephone circuit, said source of alternating current being connected to one of the pairs of plates of the oscilloscope, means for applying the reflected voltage to the other pair of plates of the oscilloscope, and means for varying the frequency of said source progressively over a broad range so as to obtain the frequencies at which identical patterns are obtained on the screen of said oscilloscope.

6. Measuring apparatus comprising a line to be tested, an oscillator connected to said line, an indicating instrument having two coacting elements for observing the relative phases of the voltages impressed upon the two elements, means for connecting one of the elements of said instrument to said oscillator, and means for connecting the circuit to the other element of said instrument, the oscillator being adjustable in frequency over a range corresponding to the range of frequencies for which said circuit may be utilized.

NELS KERMIT OLSON.